(12) United States Patent
Klein et al.

(10) Patent No.: US 10,445,757 B2
(45) Date of Patent: Oct. 15, 2019

(54) PROMOTION SERVICE

(75) Inventors: Reuben Klein, East Brunswick, NJ (US); Sreenivasa Gorti, Austin, TX (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1034 days.

(21) Appl. No.: 13/298,845

(22) Filed: Nov. 17, 2011

(65) Prior Publication Data
US 2013/0132183 A1    May 23, 2013

(51) Int. Cl.
*G06Q 30/00* (2012.01)
*G06Q 30/02* (2012.01)

(52) U.S. Cl.
CPC ..... *G06Q 30/0207* (2013.01); *G06Q 30/0248* (2013.01); *G06Q 30/0251* (2013.01); *G06Q 30/0261* (2013.01)

(58) Field of Classification Search
CPC . H04W 4/12; H04M 1/72552; H04M 3/4878; G08G 1/096725; G06F 17/3089; G06Q 30/0207; G06Q 30/00; G06Q 30/0225; G06Q 30/0251; G06Q 30/0238; G06Q 30/06; G06Q 20/3274; G06Q 20/20; G06Q 20/387; G06Q 30/0241; G06Q 30/0277; G06Q 30/0601; G06Q 30/0222
USPC .................. 705/14.1; 370/395.21; 707/709, 707/E17.108, 758, 780, E17.014
See application file for complete search history.

(56) References Cited

U.S. PATENT DOCUMENTS

| | | | | |
|---|---|---|---|---|
| 5,924,078 A | * | 7/1999 | Naftzger | G06Q 20/20 705/14.26 |
| 8,195,133 B2 | * | 6/2012 | Ramer | G06F 17/30749 455/414.1 |
| 8,799,075 B2 | * | 8/2014 | Kakarla | G06Q 20/00 704/2 |
| 2003/0233276 A1 | * | 12/2003 | Pearlman | G06Q 20/3274 705/14.23 |
| 2010/0069093 A1 | * | 3/2010 | Morrison | G08G 1/096716 455/456.3 |
| 2010/0273513 A1 | * | 10/2010 | Hsu | 455/466 |

(Continued)

OTHER PUBLICATIONS

MyCouponLocker.com, www.mycouponlocker.com retrieved Nov. 17, 2011.

(Continued)

*Primary Examiner* — Naresh Vig
(74) *Attorney, Agent, or Firm* — Hartman & Citrin LLC

(57) ABSTRACT

Concepts and technologies are disclosed herein for providing, storing, redeeming, and managing promotions. A promotion service can be called to save, manage, or redeem promotions. The promotion service can be called to generate or provide promotions based upon contextual information. The promotion service also can be accessed to save promotions as well as to view or redeem saved promotions. In some implementations, the promotions can be stored in a promotion locker or other data storage device that is accessible to the promotion service. Promotions can be redeemed at a point of sale such as a web site or a physical retailer. In one contemplated embodiment, a user accesses the promotion service via a smart phone, and a bar code or other information associated with the promotion is displayed on the smart phone in response to a user request.

20 Claims, 11 Drawing Sheets

(56) References Cited

U.S. PATENT DOCUMENTS

| | | | |
|---|---|---|---|
| 2011/0015987 A1 | 1/2011 | Chakraborty et al. | |
| 2011/0047019 A1* | 2/2011 | Cervenka | G06Q 20/20 705/14.26 |
| 2011/0047141 A1* | 2/2011 | Courchesne | G06F 17/3089 707/709 |
| 2011/0231265 A1* | 9/2011 | Brown | G06Q 30/02 705/14.73 |
| 2012/0158507 A1* | 6/2012 | Thrapp | G06Q 30/0256 705/14.54 |
| 2012/0239288 A1* | 9/2012 | Forutanpour | G01C 21/3461 701/410 |
| 2013/0073374 A1* | 3/2013 | Heath | G06Q 30/02 705/14.39 |
| 2013/0191195 A1* | 7/2013 | Carlson | G06Q 30/0261 705/14.17 |

OTHER PUBLICATIONS

My Kroger Plus, www.kroger.com/mykroger/Pages/default.aspx retrieved Nov. 17, 2011.

Grocery Coupon Network, www.grocerycouponnetwork.com/onlinecoupons retrieved Nov. 17, 2011.

\* cited by examiner

PROMOTION SERVICE

BACKGROUND

This application relates generally to providing promotions via electronic mechanisms. More specifically, the disclosure provided herein relates to providing, storing, redeeming, and managing promotions.

Promotions are often used by retailers or other entities to persuade users to purchase products or services. In some cases, for instance, retailers offer products or services at little to no profit, or even at a loss, to increase traffic to an online or physical retail location. These promotions are sometimes targeted at specific customers based upon purchase histories or other information. Other times, promotions are shared with a number of customers or groups of customers.

With online promotions, there are several challenges to providing promotions to customers. One challenge is that online users are prone to share or forward promotions or promotion codes obtained from retailers. Another challenge arises with respect to tracking usage of promotions and/or imposing limits on such usage. As such, online promotions are often offered at the point-of-sale. Because customers already may have selected a particular retailer by the time the promotion is obtained, such promotions may have little impact on directing customers to the retailer.

Users also often face challenges with respect to tracking promotions that have been obtained. As many promotions are received via email or found online, customers may print information relating to the promotions or attempt to remember promotions that have been obtained. Because these approaches are prone to mistakes, customers frequently forget to redeem available promotions during a purchase. As such, users and retailers face many challenges when attempting to provide and/or use promotions. As such, many promotion programs fail to provide intended results.

SUMMARY

The present disclosure is directed to providing, storing, redeeming, and managing promotions. In some embodiments a promotion service is provided. The promotion service can be executed by a real or virtual machine such as a server computer, a desktop computer, or other device or network node. The promotion service can be called by users, web servers, and/or other entities to obtain promotions. In some embodiments, for example, a web server hosts a resource such as a web page that includes a reference to the promotion service. Upon loading the resource, the web server can call the promotion service via a request. The promotion service can provide a promotion to the web server and the promotion can be provided to a user device loading the resource. The promotions can be customized to the user based upon various factors including, but not limited to, user activity, user purchasing and/or promotion usage history, account information, payment history, shopping and/or promotion redemption history, location information, combinations thereof, or the like. In other embodiments, a user device loads the resource and obtains the promotion directly from the promotion service in response to a request.

The promotion service also can be called to manage and/or redeem promotions. A user or other entity can access the promotion service and view saved promotions. The promotions can be organized, deleted, shared, and/or redeemed by the users via interactions with the promotion service. In some implementations, the promotions can be stored in a promotion locker or other data storage device that is accessible to the promotion service. Promotions can be redeemed at a point of sale such as a web site or a physical retailer. In one contemplated embodiment, a user accesses the promotion service via smart phone, and a bar code or other information associated with the promotion is displayed on the smart phone in response to a user request.

According to one aspect of the concepts and technologies disclosed herein, a method for providing a promotion is disclosed. In some embodiments, the method includes receiving, at a promotion service, a request to provide the promotion to a device in communication with the promotion service, determining, at the promotion service, an identity associated with the request and a context associated with the request, and selecting, at the promotion service, the promotion from two or more promotions. The promotion can be selected to provide to the device based, at least partially, upon the identity and the context. The method also can include providing the promotion to the device.

In some embodiments, the device includes a web server operating in communication with the promotion service and the identity includes identifying information associated with a user device accessing the web server. The web server can host a web page accessed by the user device. The context further can include content of the web page hosted by the web server. Thus, in some embodiments selecting the promotion includes selecting the promotion based upon a relevance of the promotion to the content of the web page. In some embodiments, determining the identity includes determining a user associated with the request and the context includes a market and shopping history associated with the user. In other embodiments, the shopping history includes a promotion redemption history associated with the user. Determining the identity also can include determining an identity associated with the device. In some embodiments, the promotion includes a command embedded in the promotion, and wherein the command includes code for calling the promotion service to store the promotion.

According to some embodiments, the method further includes receiving, at the promotion service, a request to store the promotion, the request being associated with a user account, determining if the user account associated with the identity is entitled to the promotion, and storing the promotion in response to determining that the user account is entitled to the promotion. In some embodiments, determining if the user account is entitled includes determining if the promotion service has previously stored the promotion for the user account, determining that the user account is entitled to the promotion in response to determining that the promotion service has not previously stored the promotion, and determining that the user account is not entitled to the promotion in response to determining that the promotion service has previously stored the promotion.

In some embodiments, the method also includes receiving, at the promotion service, a request to access stored promotions, determining an identity associated with the request to access the stored promotions, searching a promotion locker account associated with the identity for the stored promotions, and responding to the request with the stored promotions. Receiving the request for promotions can include receiving a request from a user to view a promotion locker account. In other embodiments, receiving the request for promotions can include receiving a request from a partner site for promotions associated with a user, and determining the identity can include receiving information identifying a user. The information can be received from the partner site.

According to another aspect of the concepts and technologies disclosed herein, a method for redeeming a promotion is disclosed. The method can include storing, at a data storage device in communication with a promotion service, the promotion. The promotion can be stored with data identifying a user account. The method also can include receiving, at the promotion service, a request to redeem the promotion. The request can be received from a user device in communication with the promotion service. The method also can include determining, at the promotion service, an identity of a user account associated with the request, accessing the user account to obtain promotions associated with the user account, and providing the promotions in response to the request, the promotions including the promotion.

In some embodiments, determining the identity of the user account can include obtaining information identifying the user device, reviewing a list of user devices associated with a user account, and determining that the user device is included in the list associated with the user account. The information identifying the user device can include mobile subscriber information associated with the user device. In some embodiments, determining the identity of the user account includes receiving information identifying the user account. The information can be obtained via a user interface presented at the user device. The user interface can include a field for entering the information. Determining the identity also can include determining, based upon the information, the identity of the user account. In some embodiments, the method further includes receiving, at a promotion service, a request for the promotion for presentation to the user device, determining, at the promotion service, a context associated with the request, selecting, at the promotion service, the promotion from two or more promotions, the promotion being selected to provide to the user device based, at least partially, upon the identity and the context, providing the promotion for presentation to the user device, receiving a storage request from the user device, the storage request including a request to store the promotion in the user account, and storing the promotion in response to receiving the storage request.

According to yet another aspect of the concepts and technologies disclosed herein, a computer storage medium includes computer executable instructions stored thereon that, when executed by a computer, cause the computer at least to receive, from a web server, a request for a promotion for presentation with a web page hosted by the web server, determine a context associated with the request, the context including content of the web page, select the promotion from two or more promotions, the promotion being selected based, at least partially, upon the context, respond to the request with the promotion, the promotion including executable code for requesting storage of the promotion in a user account with information identifying the promotion, receive a storage request including a request to store the promotion in the user account, and store the promotion in response to receiving the storage request.

In some embodiments, determining the context includes determining a user associated with the request, a market within which the user is located, and a shopping history associated with the user. The shopping history can include a promotion redemption history associated with the user. In some embodiments, the computer storage medium further includes computer executable instructions that, when executed by the computer, cause the computer to receive a request to access stored promotions, determine an identity associated with the request to access the stored promotions, search a promotion locker account associated with the identity to identify stored promotions, and respond to the request with the stored promotions.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for providing, storing, redeeming, and managing promotions. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and the like.

Figure 1:
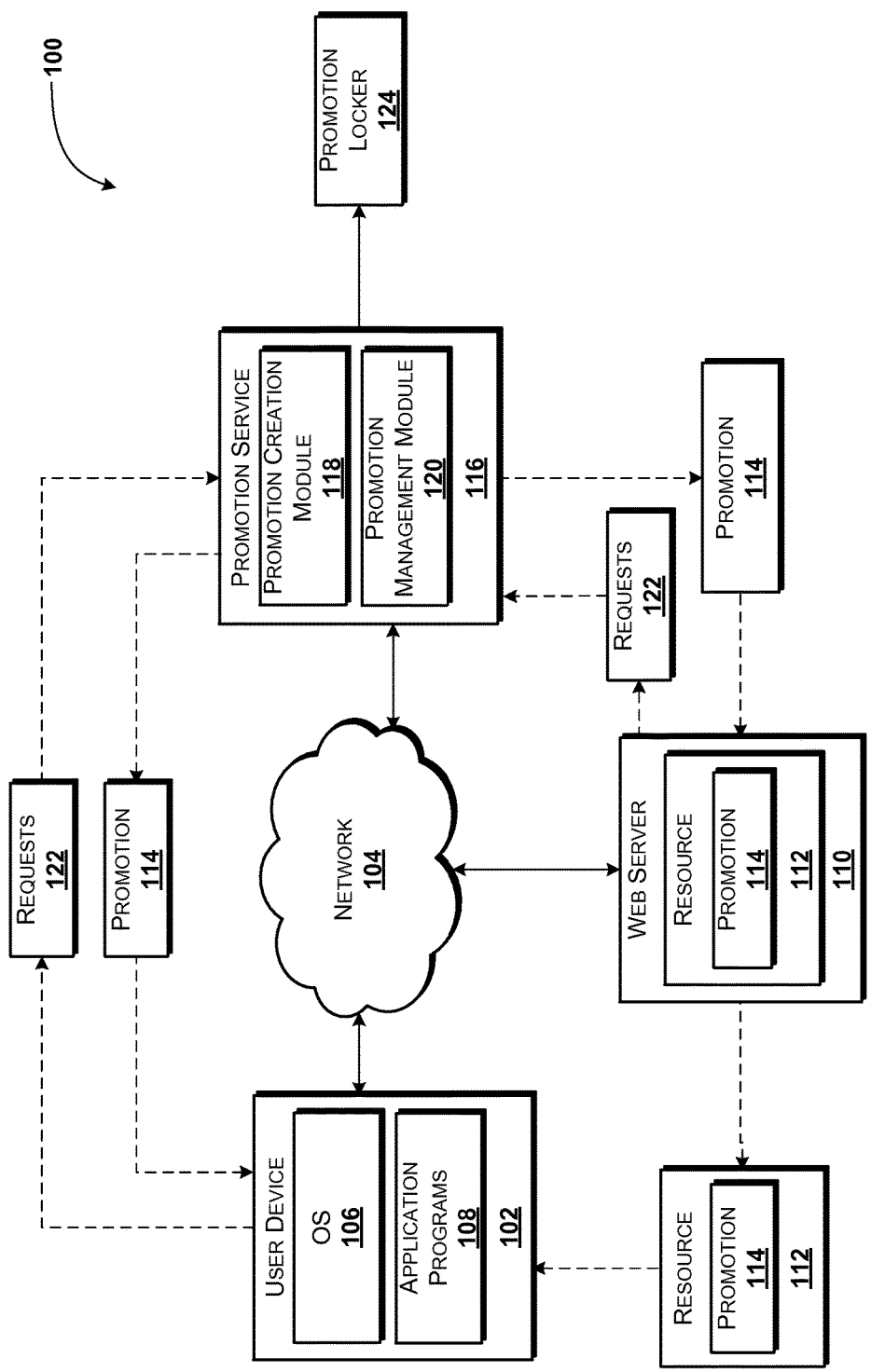
FIG. 1 is a system diagram illustrating an illustrative system for providing, storing, redeeming, and managing promotions, according to various embodiments disclosed herein.

Referring now to FIG. 1, aspects of an operating environment 100 configured to provide, store, manage, and enable redemption of promotions according to some illustrative embodiments presented herein will be described. The operating environment 100 shown in FIG. 1 includes a user device 102. According to various embodiments, the user device 102 is configured to communicate with one or more devices operating in communication with or as part of a communications network ("network") 104. According to various embodiments, the functionality of the user device 102 described herein may be provided by one or more server computers, desktop computers, mobile telephones, laptop computers, set-top boxes ("STBs"), other computing systems, and the like. The user device 102 can execute an operating system 106 and one or more application programs 108.

The operating system 106 is a computer program for controlling the operation of the user device 102. The application programs 108 are executable programs configured to execute on top of the operating system 106 to provide various functionality. According to some embodiments, for example, the application programs 108 include web browsers, shopping applications, stand-alone applications, web-enabled applications, multimedia applications, other applications, combinations thereof, and the like. In the described embodiments, the application programs 108 are described as including a web browser for interacting with various online resources such as web pages, account profiles, coupon or promotion accounts, combinations thereof, and the like. Because web browsers are generally understood, these application programs 108 are not described herein in additional detail.

According to various embodiments, the user device 102 is configured to interact with a web server 110 that operates as a part of or in communication with the network 104. The functionality of the web server 110 can be provided by one or more server computers, virtual computer resources, and/or other real or virtual computing resources. In some embodiments, for example, the web server 110 stores and/or hosts a web page or other resources ("resource") 112. In various embodiments described herein, the resource 112 includes a web page. Because the resource 112 can include additional and/or alternative resources, it should be understood that this embodiment is illustrative, and should not be construed as being limiting in any way.

As shown in FIG. 1, the resource 112 can include a promotion 114. In some embodiments, wherein the resource 112 corresponds to a web page or web application, the promotion 114 can include an advertisement, a coupon offer, a testimonial, and/or other promotions. For purposes of describing the concepts and technologies disclosed herein, the concepts and technologies disclosed herein are described with reference to an embodiment wherein the promotion 114 includes a coupon. It should be understood that this embodiment is illustrative, and should not be construed as being limiting in any way.

The operating environment 100 also can include a promotion service 116 operating as part of or in communication with the network 104. In some embodiments, the promotion service 116 is hosted by a virtual server. In other embodiments, the promotion service 116 is hosted on a server computer or web server. The promotion service 116 is configured to be called by the user device 102 and/or the web server 110. In some embodiments, the promotion service 116 provides functionality for creating and providing the promotions 114 to the web server 110. Thus, the promotion service 116 is illustrated as including a promotion creation module 118, though inclusion of this module is not required in all embodiments. As such, it should be understood that this embodiment is illustrative, and should not be construed as being limiting in any way.

In some embodiments, the promotion service 116 also is configured to manage, store, and enable redemption of promotions 114 for one or more users of the promotion service 116. As such, the promotion service 116 can include a promotion management module 120. The promotion management module 120 is configured to receive one or more requests 122 from the user device 102. The requests 122 can instruct the promotion management module 120 to store a promotion 114 that a user of the user device 102 has encountered, for example, when reading a web page or other resource such as the resource 112. The requests 122 also can include a request to redeem a stored promotion 114. It should be understood that storage and redemption of promotions 114 can be accomplished by storing information associated with the promotions 114. As such, the actual promotions need not be, and generally are not, actually stored by the promotion service 116. Because the promotion management module 120 is not required in all embodiments, it should be understood that this embodiment is illustrative, and should not be construed as being limiting in any way.

According to various embodiments, the promotion service 116 is configured to store data in a data storage device such as, for example, a promotion locker 124. According to various embodiments, the functionality of the promotion locker 124 described herein may be provided by one or more server computers, databases, datastores, computer readable media (as defined herein), desktop computers, mobile telephones, laptop computers, other computing systems, and the like. The promotion locker 124 can be configured as a data storage of the promotion service 116 and/or as a separate storage device operating in communication with the promotion service 116. The promotion locker 124 can be queried, for example, when the promotion service 116 receives a request 122 to retrieve a coupon or other promotion for redemption, when a request 122 for managing a promotion locker account associated with a user, when a request 122 for storing a promotion is received by the promotion service 116, and/or at other times.

In one contemplated embodiment, the concepts and technologies disclosed herein are provided to provide a promotion 114 to a user, to receive a request 122 to "clip" or otherwise store the promotion 114, to enable management of a promotion account associated with the user, and to enable redemption of the promotion 114 at some time. For example, in one embodiment a web page is hosted as the resource 112 by the web server 110. A user device 102 connects to the web server 110 via the network 104. The web page includes an embedded advertisement frame or window that is configured to call the promotion service 116 when the web page is loaded by the web browser or other application program 108 executed by the user device 102. The promotion creation module 118 executed by, or part of, the promotion service 116 is called by the browser or the web server 110 and a promotion 114 such as an online coupon, offer, or other promotion is provided to the browser or the web server 110.

A user viewing the webpage can determine that the promotion 114 is of interest and select or accept the promotion 114. In various embodiments, the promotion 114 is configured with functionality for calling the promotion service 116, for example, a promotion management module 120 executed by or as part of the promotion service 116 for storing the promotion 114. The promotion 114, or more particularly data describing the promotion 114, is stored by the promotion service 116 in the promotion locker 124 or other data storage device. A user can access the promotion service 116 using a browser or other application to manage and/or redeem the promotion 114.

According to various implementations, the promotion service 116 can be configured to allow multiple users and/or multiple devices associated with the user to access a single promotion account associated with a user. As such, a user may store promotions 114 or data relating thereto in the promotion locker 124 using a first device such as a tablet computer, a personal computer, a smart phone, or other computing device. The user can redeem the promotion 114 at another time and/or location using, for example, a smart phone or other device. As such, the promotion locker 124 and the functionality associated with the promotion service 116 enable multiple users to share, manage, and redeem promotions collected from any number of locations and/or devices. These and other aspects of the promotion service 116 are described in more detail herein, particularly with reference to FIGS. 2-4F.

FIG. 1 illustrates one user device 102, one network 104, one web server 110, one promotion service 116, and one promotion locker 124. It should be understood, however, that various implementations of the operating environment 100 include multiple user devices 102, multiple networks 104, multiple web servers 110, multiple promotion services 116, and multiple promotion lockers 124. As such, the illustrated embodiment should be understood as being illustrative, and should not be construed as being limiting in any way.

Figure 2:
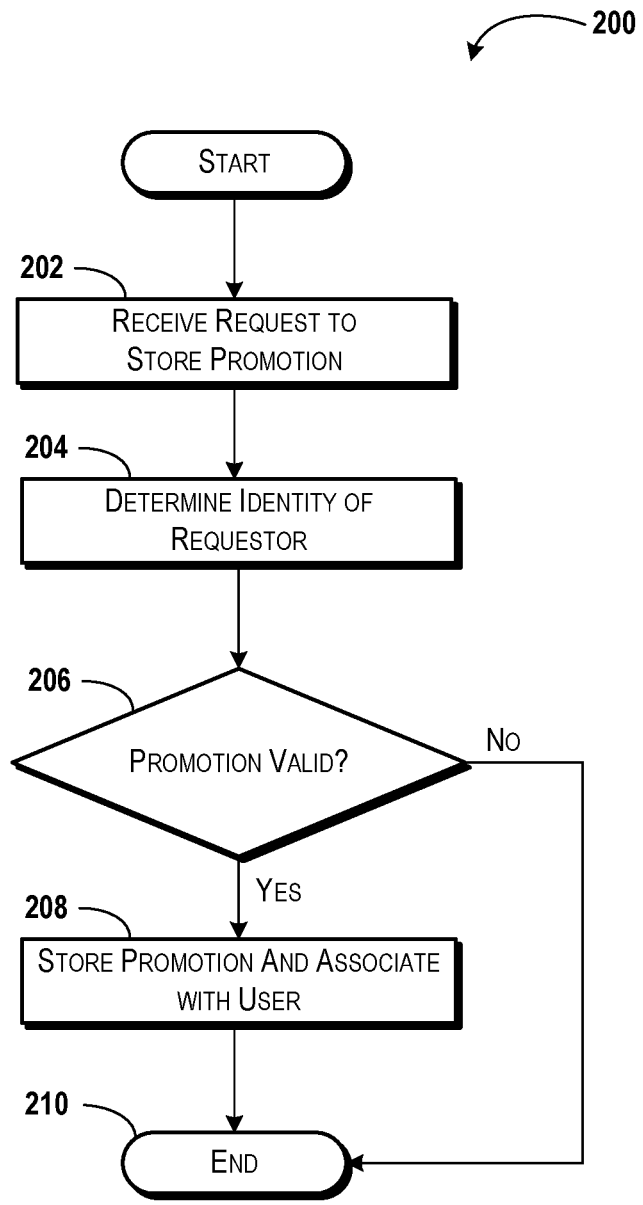
FIG. 2 is a flow diagram showing aspects of a method for storing a promotion, according to an illustrative embodiment.

Turning now to FIG. 2, aspects of a method 200 for storing a promotion will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 200 is described as being performed by the promotion service 116 via execution of one or more software modules. It should be understood that additional and/or alternative devices and/or network nodes can provide the functionality described herein via execution of one or more application programs including, but not limited to, those illustrated in FIG. 1. Thus, the illustrated embodiments are illustrative, and should not be viewed as being limiting in any way.

The method 200 begins at operation 202, wherein the promotion service 116 receives a request to store a promotion 114. As explained above with reference to FIG. 1, the request to store the promotion 114 can be received by the promotion service 116 as a call from a user device 102 or from other devices or nodes. In one contemplated embodiment, the promotion service 116 is called by the web server 110 to create the promotion 114 for a web page 112 being provided to the user device 102 by the web server 110. The promotion service 116 creates the promotion 114 and provides the promotion 114, or data referencing the promotion 114, to the web server 110 or the user device 102 during loading of the web page 112. A user viewing the web page 112 can determine that the promotion 114 is interesting, relevant, or otherwise determine to save data relating to the promotion 114. The user can click on the promotion 114, and the click or other user input can generate a call to the promotion service 116 to save or store the promotion 114. This call or request 122 can be received by the promotion service 116 in operation 202. An example user interface for presenting a promotion 114 and for sending a request 122 to store or save the promotion 114 are illustrated and described below with reference to FIGS. 4A-4B.

From operation 202, the method 200 proceeds to operation 204, wherein the promotion service 116 identifies a user associated with the request 122 received in operation 202. In some embodiments, the promotion 114 includes code for launching an authentication or sign-in screen for a user. As such, between clicking or submitting other user input for requesting saving or storage of the promotion 114 and sending the request 122 to the promotion service 116, a user or other entity may provide identity information via a user interface. An example user interface for providing identity information is illustrated and described below with reference to FIG. 4B.

In other embodiments, the promotion service 116 is configured to determine an identity of the requestor or to query other services, devices, or nodes to determine the identity of the requestor. For example, if the requestor submits the request 122 in operation 202 via a mobile device browser, the promotion service 116 can query a mobile telephone network device to determine an identity of the requestor based upon ID information that typically is obtainable by web servers interacting with mobile devices. Similarly, the promotion service 116 can be configured to identity the requestor via an IP address or other identifying information that may be obtained by the promotion service 116. Regardless of the methodology and/or mechanisms used, the promotion service 116 can be configured to identify the requestor.

From operation 204, the method 200 proceeds to operation 206, wherein the promotion service 116 determines if the promotion 114 is valid. The promotion service 116 can base this determination based upon the identity of the requestor, a location associated with the requestor, an age of the requestor, account information and/or account status information associated with the requestor, expiration date or other information associated with the promotion 114, and/or other information.

If the promotion service 116 determines in operation 206 that the promotion 114 is valid, the method 200 proceeds to operation 208. At operation 208, the promotion service 116 stores the promotion 114. The promotion service 116 can store the promotion 114 in the promotion locker 124 or other data storage device, if desired. In some embodiments, the promotion service 116 stores data identifying the requestor and associates the requestor with the stored promotion 114 in the data storage device.

From operation 208, or from operation 206 if the promotion service 116 determines that the promotion 114 is not valid, the method 200 proceeds to operation 210. The method 200 ends at operation 210.

Figure 3:
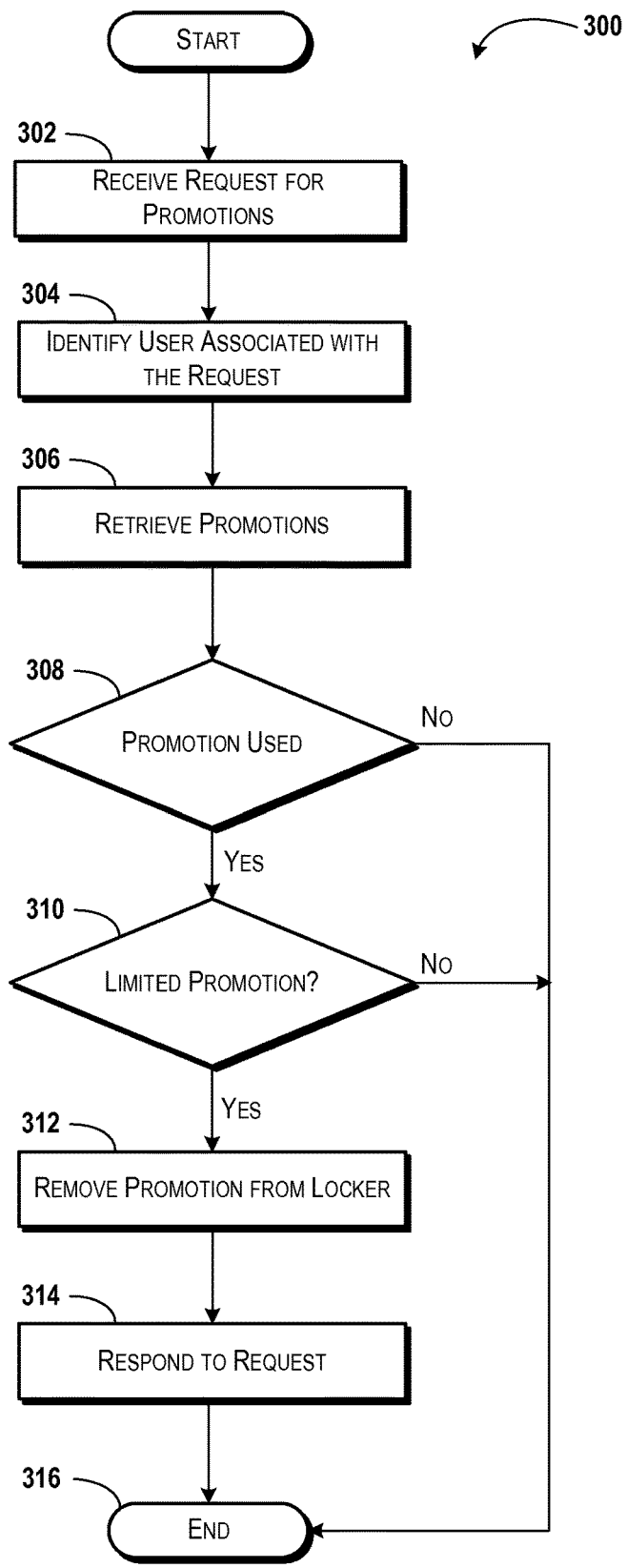
FIG. 3 is a flow diagram showing aspects of a method for accessing stored promotions, according to another illustrative embodiment.

Turning now to FIG. 3, aspects of a method 300 for accessing stored promotions 114 will be described in detail, according to an illustrative embodiment. For purposes of illustrating and describing the concepts and technologies disclosed herein, the method 300 is described as being performed by the promotion service 116 via execution of one or more software modules such as, for example, the promotion management module 120 or other functionality. It should be understood that additional and/or alternative devices, services, and/or network nodes can provide the functionality described herein via execution of one or more application programs, modules, and/or other functionality including, but not limited to, the promotion management module 120. As such, the illustrated embodiment is illustrative, and should not be viewed as being limiting in any way.

The method 300 begins at operation 302, wherein the promotion service 116 receives a request 122 for promotions 114. As explained above, the request 122 received in operation 302 can include a call of the promotion service 116 by a user device 102 or other entity. According to some embodiments, the promotion service 116 receives the request 122 from a partner site or other resource that is configured to call the promotion service 116 on behalf of a user or other entity. For example, a user may have a promotion account and an account with a partner site such as a shopping site. The shopping site can register with the promotion service 116 or otherwise be configured to access or call the promotion service 116. An example of a partner site displaying information called from the promotion service 116 is illustrated and described below with reference to FIG. 4D.

The request 122 also can be received from a user accessing the promotion service 116 to review the user's promotion account. For example, a user can login or authenticate with the promotion service 116 and the promotion service 116 can provide account information to the user. An example of a web site for reviewing a promotion account is illustrated and described below with reference to FIG. 4C. The request 122 can be transmitted to, made available to, and/or otherwise provided to the promotion service 116 by any device, node, or service.

From operation 302, the method 300 proceeds to operation 304, wherein the promotion service 116 identifies a user associated with the request 122. It can be appreciated from the above description of how the request 122 in operation 302 is received, that the promotion service 116 can identify a user or requestor via various mechanisms and/or methodologies. For example, the promotion service 116 can present a login screen to the requestor, identify the requestor from information associated with the request 122 and/or a session in which the request 122 is received, account information, information provided by a partner site, cookies, other information, and the like. Any suitable method of identifying a user requesting promotions 114, or identifying a user or entity associated with a request 122 for promotions 114, can be used in operation 304.

From operation 304, the method 300 proceeds to operation 306, wherein the promotion service 116 retrieves promotions 114 from the promotion locker 124 that are associated with the user determined in operation 304. In some embodiments, the promotion service 116 can filter the promotions 114 provided to the user based upon one or more of an account, a store or resource associated with a request 122, a physical or web location associated with the user, or other filters. In one contemplated embodiment, the promotion service 116 is configured to retrieve promotions 114 only for products offered by a particular vendor, in response to a request 122 received from the vendor. In other embodiments, the promotion service 116 is configured to retrieve promotions 114 only for products within a specified geographic distance from a requestor. Other filters are contemplated and are possible. As such, the above examples are illustrative, and should not be construed as being limiting in any way.

From operation 306, the method 300 proceeds to operation 308, wherein the promotion service 116 determines if any of the promotions 114 retrieved in operation 306 have been used, saved, and/or redeemed by the user. Some promotions 114 can have use limits, and these use limits can be tracked by the promotion service 116, if desired. In other embodiments, "clipping" (or saving) promotions 114 can be limited by the promotion service 116, and as such, the promotions 114 can have save limits, i.e., users can be limited to a number of saves of a particular promotion 114. As such, operation 308 can include the promotion service 116 accessing a user account to determine if the promotion 114 has already been saved or used by a user. Thus, the promotion service 116 can be aware of whether or not a user has used or saved a promotion 114 prior to providing the promotion 114 to the user. In other embodiments, vendors can report to the promotion service 116 via any suitable mechanisms and/or methodologies such as calling the promotion service 116 to report usage or saving of the promotions 114.

If the promotion service 116 determines, in operation 308, that one or more of the promotions 114 have been saved or used, the method 300 proceeds to operation 310, wherein the promotion service 116 determines if the promotion 114 determined to have been used or saved is a promotion 114 having use or save limits, as mentioned above. If the promotion service 116 determines, in operation 310, that the promotion 114 determined to have been used has use or save limits, and if the use or save limits are determined to have been exceeded, the method 300 proceeds to operation 312.

At operation 312, the promotion service 116 removes the promotion 114 from the promotion locker 124 or marks the promotion 114 as used or saved. As such, some embodiments of the promotion service 116 remove used or saved promotions 114 from the promotion locker 124 if the promotion 114 has previously been saved or used. These features can be used by the promotion service 116 to prevent users from saving promotions 114 to the promotion locker 124 if the promotion 114 is already present in the promotion locker 124 and/or if the promotion 114 already has been redeemed by a user. The promotion service 116 also can determine not to return the promotion 114 to a requestor or user requesting the promotions 114. From operation 312, the method 300 proceeds to operation 314, wherein the promotion service 116 responds to the request 122 with the promotions 114 obtained in operation 306.

From operation 314, the method 300 proceeds to operation 316. The method 300 also proceeds to operation 316 if the promotion service 116 determines, in operation 308, that one or more of the promotions 114 has not been used. The method 300 also proceeds to operation 316 if the promotion service 116 determines, in operation 310, that a promotion 114 determined to have been used does not have use limits, or that the use limits have not been met or exceeded. The method 300 ends at operation 316.

Figure 4A:
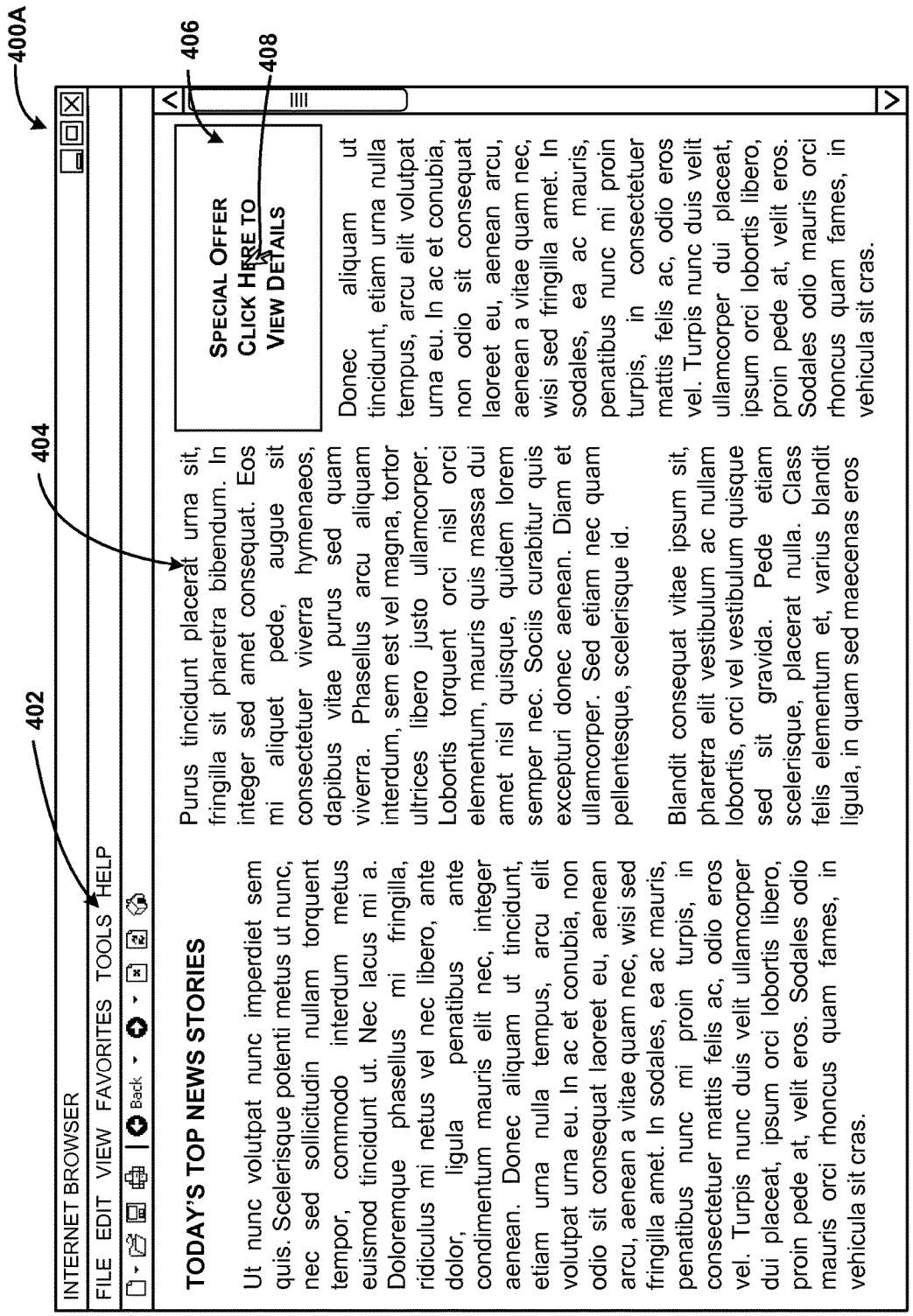
FIGS. 4A-4F are user interface diagrams illustrating some aspects of the concepts and technologies disclosed herein, according to various illustrative embodiments.

Turning now to FIG. 4A, a UI diagram showing aspects of a UI for viewing a promotion 114 in some embodiments will be described. In particular, FIG. 4A shows a screen display 400A that can be presented at the user device 102 to provide the functionality herein for viewing a resource 112 having an embedded promotion 114. In some embodiments, the screen display 400A is generated by one of the application programs 108 executing at the user device 102, for example, a web browser. The source code for the displayed web page can be generated by a web server such as the web server 110, by the promotion service 116, and/or by other entities. It should be appreciated that the UI diagram illustrated in FIG. 4A is illustrative of one contemplated embodiment, and therefore should not be construed as being limiting in any way.

The screen display 400A shown in FIG. 4A includes various menu items 402. It should be understood that the illustrated menu items 402 are illustrative and that additional and/or alternative menu items are possible and are contemplated. For example, various commands, command ribbons, icons, search boxes, input boxes, and/or other UI controls for viewing and/or interacting with the information shown on the screen display 400A can be presented on the screen display 400A without departing from the scope of the appended claims. The screen display 400A is illustrated as displaying a news page 404. It should be understood that this embodiment is illustrative, and should not be construed as being limiting in any way.

The screen display 400A also is illustrated as displaying a coupon, promotion, advertisement, or other offer ("offer") 406. It should be understood that the offer 406 shown in FIG. 4A can correspond to the promotion 114 described herein. As mentioned above, the offer 406 can be generated by the promotion service 116 or another entity based upon contextual information associated with the displayed news page 404, based upon a location associated with a user viewing the news page 404, based upon user or search profiles associated with the user, and/or based upon other considerations. Any suitable mechanisms and/or methodologies for identifying a promotion 114 based upon contextual, location, user, account, or other information can be used to identify and provide the promotion 114 and/or the offer 406.

As shown in FIG. 4A, the offer 406 can be embedded in the news page 404 as a graphic, text, link, or other functionality. In the illustrated embodiment, the offer 406 includes functionality associated with a UI control for accessing details associated with the offer 406, though this is not necessarily the case. As shown in FIG. 4A, a mouse pointer 408 or other user interface control is illustrated as being used to select the offer 406. It should be understood that this embodiment is illustrative, and should not be construed as being limiting in any way. Selection of, hovering over, or other user input for indicating an interest in the offer 406 can cause the user device 102 or entity to access or otherwise provide additional functionality for providing, storing, managing, and/or redeeming the offer 406. According to various implementations, the providing, storing, managing, and/or redeeming of the offer 406 can be conducted through a promotion service 116 or other functionality as described herein.

Figure 4B:
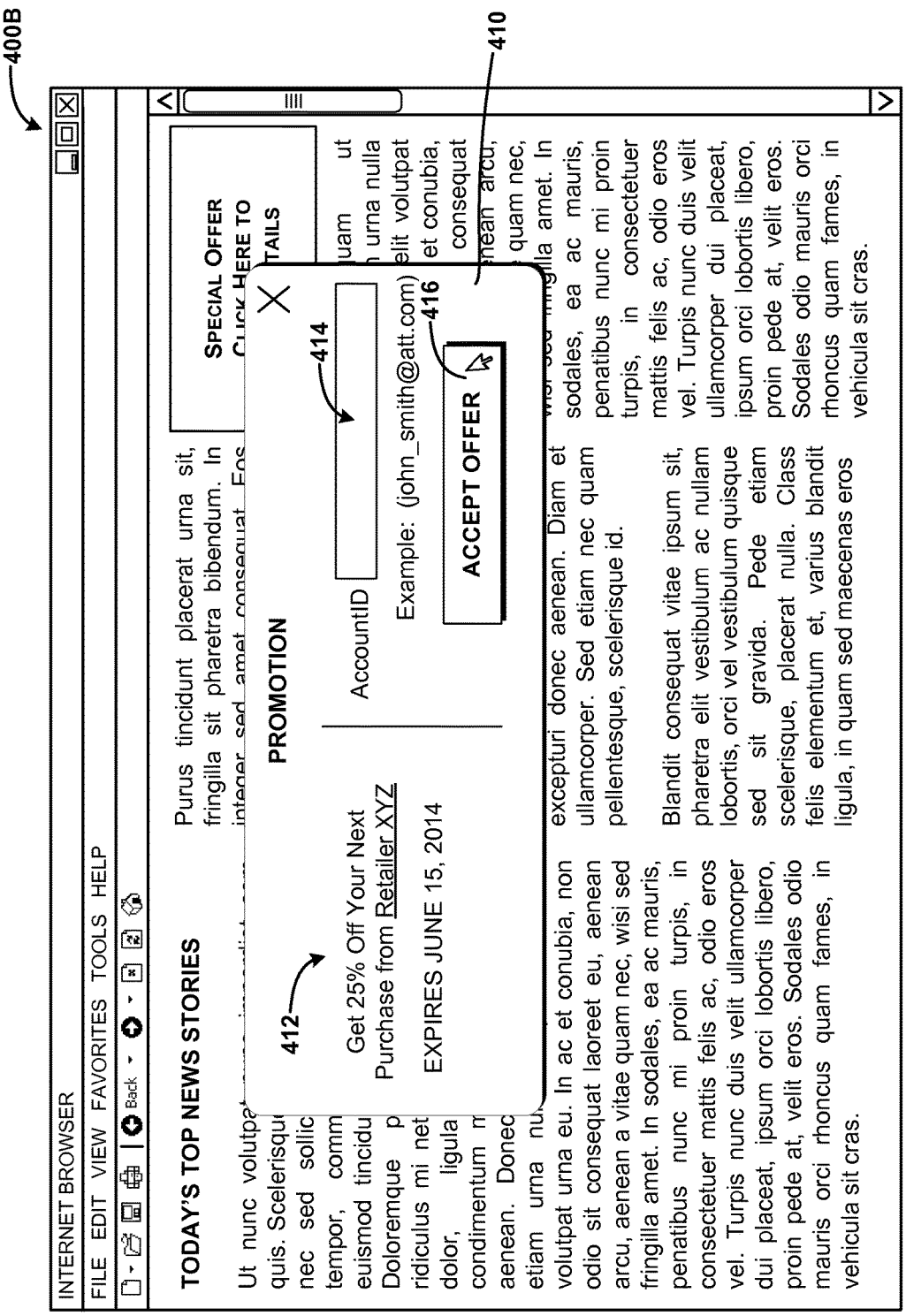

Turning now to FIG. 4B, a UI diagram showing aspects of a UI for storing promotions 114 or other offers such as the offer 406 will be described, according to an illustrative embodiment. The UI illustrated in FIG. 4B can be, but is not necessarily, generated in response to receiving or detecting a selection of the offer 406 illustrated in FIG. 4A. Thus, selection of the offer 406 in the screen display 400A can prompt the application programs 108 executing at the user device 102 to render the screen display 400B shown in FIG. 4B. It should be appreciated that the UI diagram illustrated in FIG. 4B is illustrative of one contemplated embodiment, and therefore should not be construed as being limiting in any way.

The screen display 400B includes an offer details window 410. The offer details window 410 is illustrated as displaying additional details 412 associated with the selected offer 406. The details 412 associated with an offer, promotion 114, or coupon such as the offer 406 can include, but are not limited to, an amount of money or credit or a percentage discount associated with the offer 406, a retailer associated with the offer 406, an expiration date for the offer 406, if any, a link for accessing a web site or information relating to a physical location associated with the retailer or offer 406, other information, and the like. Because additional or alternative information can be included in the offer details window 410, the illustrated embodiment should not be construed as being limiting in any way.

The offer details window 410 also can include a login window or area 414 for a user or other entity to log into or authenticate with the promotion service 116, if desired. A user can log in or authenticate with the promotion service 116 to associate activity occurring at the user device 102 with the user. For example, submission of a user identification ("AccountID") associated with the user via entry of a text string in the login window or area 414 and selection of the accept UI control 416 illustrated in the offer details window 410 can cause the user device 102 to submit data to the promotion service 116. The data submitted to the promotion service 116 can indicate that the user wishes to save the offer 406 or details associated therewith to the promotion locker 124 and/or associate a stored offer 406 or other promotion 114 with the user's account. The data also can be submitted to prompt a follow-up by the user, to search for additional offers or other promotions 114 that may be similar or relevant to the offer 406, or for other reasons. It should be understood that this embodiment is illustrative, and should not be construed as being limiting in any way.

Figure 4C:
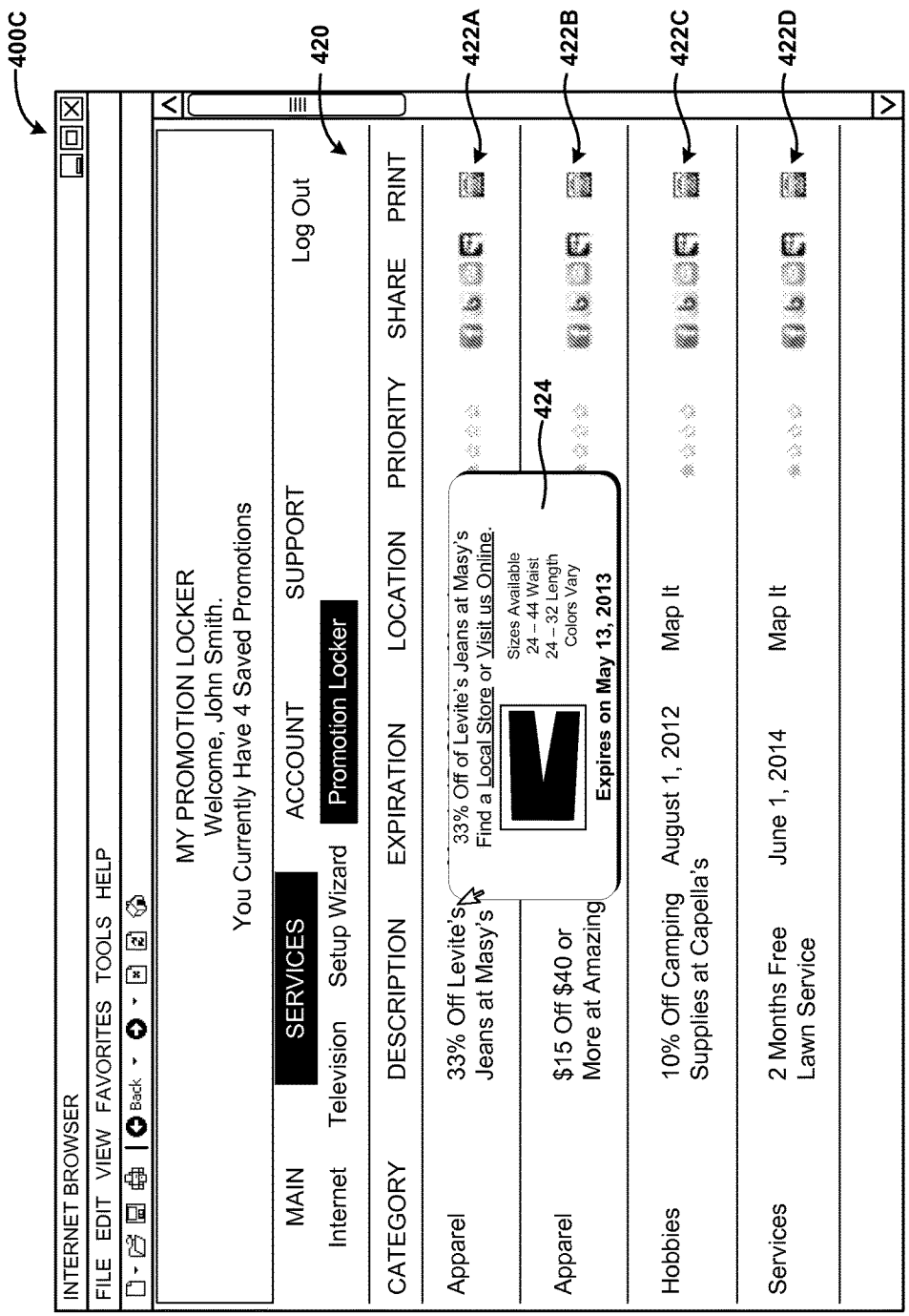

Turning now to FIG. 4C, a UI diagram showing aspects of a UI for viewing a promotion locker account associated with a user will be described, according to an illustrative embodiment. In particular, FIG. 4C shows a screen display 400C that can be presented at the user device 102 to provide the functionality herein for viewing a promotion locker account associated with a user. In some embodiments, the screen display 400C is generated by one of the application programs 108 executing at the user device 102, for example, a web browser, though this is not necessarily the case. It should be appreciated that the UI diagram illustrated in FIG. 4C is illustrative of one contemplated embodiment, and therefore should not be construed as being limiting in any way.

The screen display 400C includes various menu and navigation items and a promotion account display window 420. The promotion account display screen includes rows 422A-D (hereinafter collectively and/or generically referred to as "rows 422"). The rows 422 can correspond to promotions 114 that have been saved by a user or on behalf of the user. For example, one or more of the rows 422 can correspond to an offer or promotion such as the offer 406 illustrated in FIGS. 4A-B, though this is not necessarily the case. As such, a user can view the promotion account display window 420 to see promotions 114 that have been associated with the user's account by the user or other entities. In some embodiments, the promotion account display window 420 is configured for display by a web browser or other suitable application program. As such, some embodiments of the concepts and technologies disclosed herein allow users to view the promotion account display window 420 at a personal computer, a tablet computer, a laptop or notebook computer, a netbook computer, a smart phone, a personal data assistant, a mobile telephone, a display connected to a set-top box ("STB"), or other suitable display device.

The screen display 400C can be configured to provide live links and/or embedded functionality within the promotion account display window 420. For example, a mouse pointer hover motion or other user input such as a voice command, a text command, a finger or hand gesture, a movement, a stylus touch, or other command can be used to indicate an interest in the row 422A. In response to the user input, a saved promotion details window 424 can be presented. The saved promotion details window 424 can include information associated with the saved promotion 114 such as offer details, a photo of a product, links for finding a real or virtual location for the retailer, options available for the product or services associated with the promotion 114, an expiration date, if one exists, other information, combinations thereof, or the like. Thus, a user can view saved promotions 114 and/or access additional details associated with the promotions 114, if desired, via the screen display 400C.

Figure 4D:
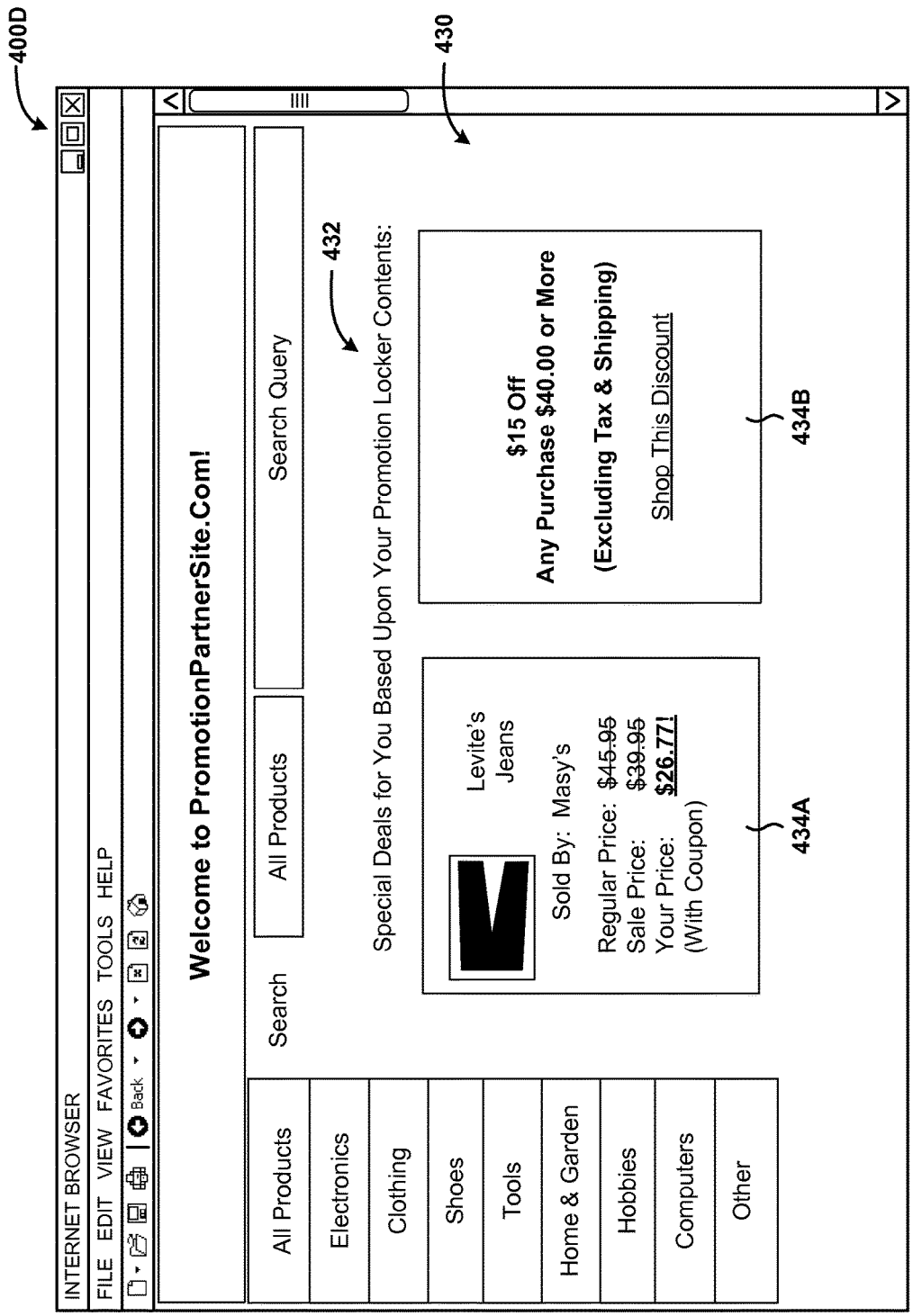

Turning now to FIG. 4D, a UI diagram showing aspects of a UI for retrieving and redeeming coupons in one illustrative embodiment will be described. The screen display 400D includes a web page 430. The web page 430 can be, but is not necessarily, associated with a partner site for the promotion service 116. According to some embodiments, a user authenticates with the partner site or other entity associated with the web page 430. In other embodiments, a user may authenticate or automatically be authenticated with the partner site, an action that can be understood to grant access to the user's promotion locker account. It can be appreciated that users can grant access to their promotion locker account via account settings and/or preferences, or can explicitly authenticate with the promotion service 116 via a web portal or other mechanism hosted by the partner site and/or embedded in the web page 430.

As shown in FIG. 4D, the screen display 400D includes an indication 432 that the user's promotion locker account has been accessed. The screen display 400D also includes two advertisements 434A, 434B (hereinafter collectively or generically referred to as advertisements 434). The advertisements 434 can include information based upon data retrieved from the user's promotion locker account. For example, the advertisement 434A can show a user's price for a product if a coupon associated with the user's promotion locker account is applied to a sold or advertised good. Similarly, the advertisement 434B can display a discount available to the user. It should be understood that these embodiments are illustrative, and should not be construed as being limiting in any way.

It can be appreciated with reference to FIG. 4D that embodiments of the concepts and technologies disclosed herein allow users to shop at various places including, but not limited to, partner sites, to redeem or use promotions 114 without manually entering codes, keeping track of physical coupons, entering discount codes, and the like. Some embodiments of the concepts and technologies disclosed herein allow users to use and/or view discounts or other promotions 114 automatically or via logging in at a web site or other resource 112 configured to communicate with the promotion service 116.

Figure 4E:
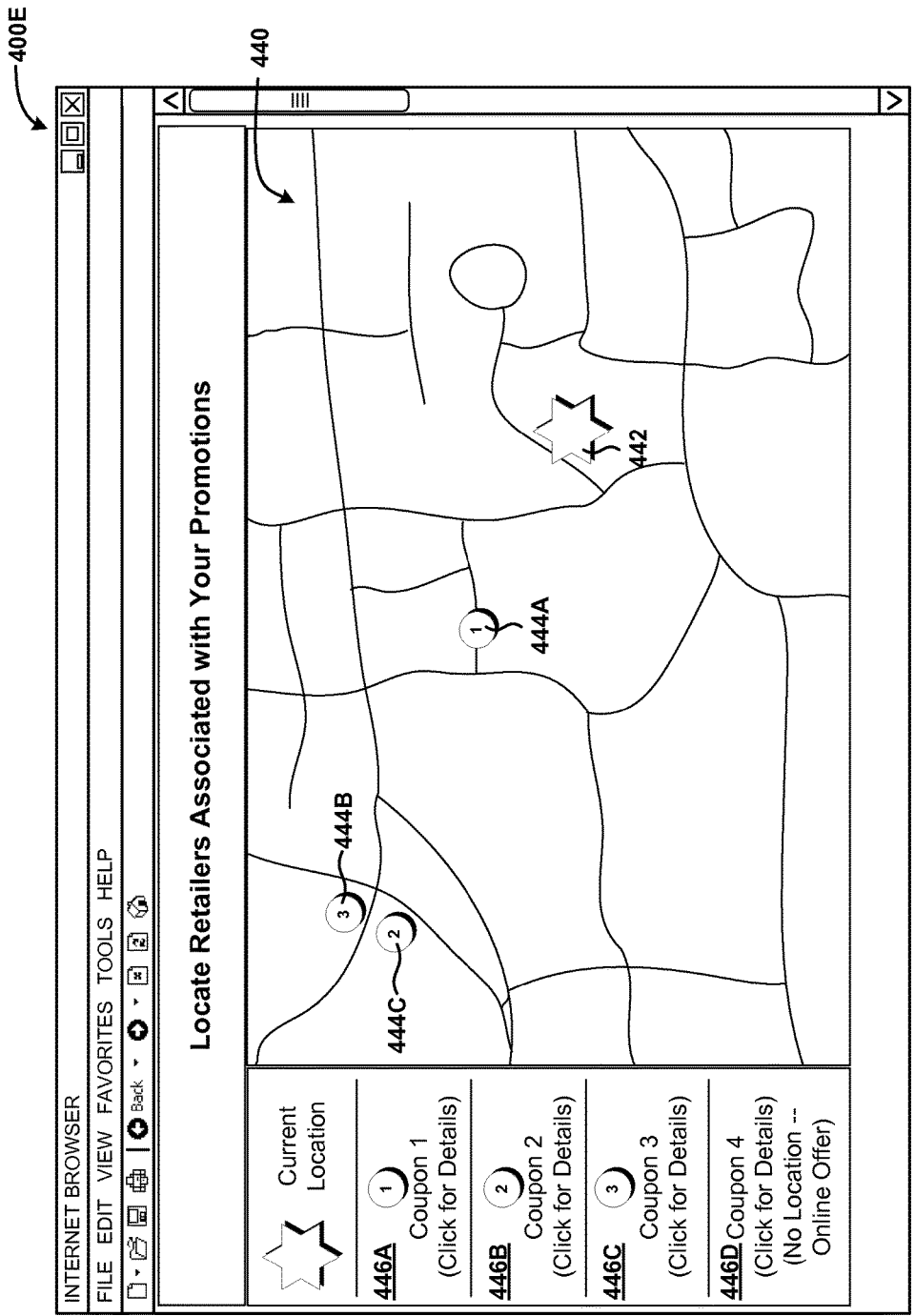

Turning now to FIG. 4E, a UI diagram showing aspects of a UI for viewing location information associated with promotions 114 will be described, according to one illustrative embodiment. The screen display 400E includes a map view 440. The map view 440 can display a map for viewing various locations such as, for example, a current location, locations of retailers associated with promotions 114, a search area, or other locations. It should be appreciated that the UI diagram illustrated in FIG. 4E is illustrative and therefore should not be construed as being limiting in any way.

In the illustrated embodiment, the map view 440 displays a current location 442. The current location 442 can correspond to a location of a user at a particular time, to an address associated with a user account, or another location. In the illustrated embodiment, the current location 442 corresponds to a location at which the user is located when the map view 440 is loaded. In some embodiments, the current location 442 can be updated based upon movement of the user. For example, the user may view the map view 440 on a smart phone equipped with GPS, and the current location 442 thus can be updated in response to movement of the smart phone as measured by the GPS. It should be understood that this embodiment is illustrative, and should not be construed as being limiting in any way.

The map view 440 also displays three retailer locations 444A-C (hereinafter collectively and/or generically referred to as retailer "locations 444"). While only three retailer locations 444 are shown in FIG. 4E, it should be understood that any number of retailer locations 444 can be shown. Each of the retailer locations 444 can be associated with one or more of the illustrative promotions shown in FIG. 4E, namely the promotions 446A-C. As shown in FIG. 4E, a retailer location 444 is not shown for the promotion 446D. In the illustrated embodiment, this results from the promotion 446D being associated with an online store instead of a physical location near the user. It should be understood that a retailer location 444 associated with a promotion 446 also may not be shown for other reasons such as, for example, a maximum number of viewable retailer locations 444 are shown, a retailer location 444 is outside of a viewable area of the map in the map view 440, user preferences, and the like. As such, it should be understood that this embodiment is illustrative, and should not be construed as being limiting in any way.

By using the map view 440, users can see locations associated with saved promotions 114. As such, a user may use the concepts and technologies disclosed herein to search for local promotions. Such embodiments can be particularly useful if a user travels to a shopping mall or other concentration of retailer locations 444 for whom the user has saved promotions 114. As such, embodiments of the concepts and technologies disclosed herein provide mechanisms and methodologies for providing efficient redemption of promotions 114, among other features. It should be understood that this embodiment is illustrative, and should not be construed as being limiting in any way. While the above user interface diagrams have described various features separately in the various FIGURES, it should be understood that some, all, or none of the features in each of the FIGURES can be used in combination with other features shown in the other FIGURES without departing from the scope of the appended claims.

Figure 4F:
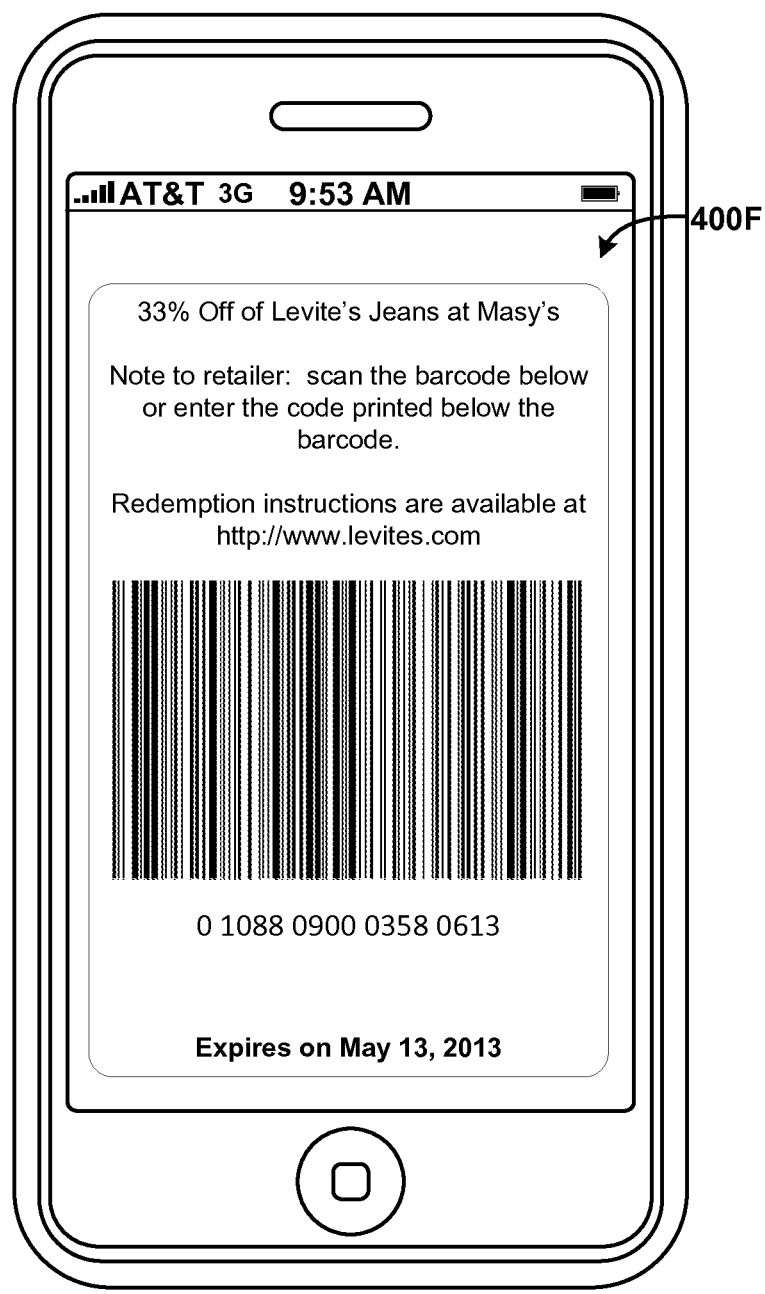

As explained above, various implementations of the concepts and technologies disclosed herein allow users to save and manage promotions 114. In another embodiment, users can access a promotion locker account to obtain a promotion 114 at a point of sale such as a retail location or online address. In one contemplated embodiment, a user selects an option to display a promotion 114 at the user device 102. In one embodiment, the user device 102 corresponds to a smart phone. In response to the selection of the option, a bar code or other human or computer-readable information is displayed on the smart phone display in a manner that allows a human or computer to read the information. An example of a user interface for displaying a promotion 114 in a readable format is presented in FIG. 4F. As such, it can be appreciated that FIG. 4F shows a screen display 400F for redeeming a promotion 114, according to one illustrative embodiment. It should be understood that this embodiment is illustrative, and should not be construed as being limiting in any way.

The application programs 108 executed by the user device 102 also can be configured to report use of the promotion 114 to the promotion service 116. In other embodiments, retailers report use of the promotions 114 to the promotion service 116. As such, in response to using the promotion 114 as shown in FIG. 4F or in any other way, the promotion service 116 can receive a command to remove the promotion 114 from the user's promotion locker account. As such, the promotion service 116 can manage the user's promotion locker account automatically, if desired and/or if such functionality is enabled by users. Similarly, partner sites can report usage of promotions 114, if desired. Also, the promotion service 116 can report usage of promotions 114 to partners and/or other entities such as advertisers, if desired, for various purposes. It should be understood that these embodiments are illustrative, and should not be construed as being limiting in any way.

Figure 5:
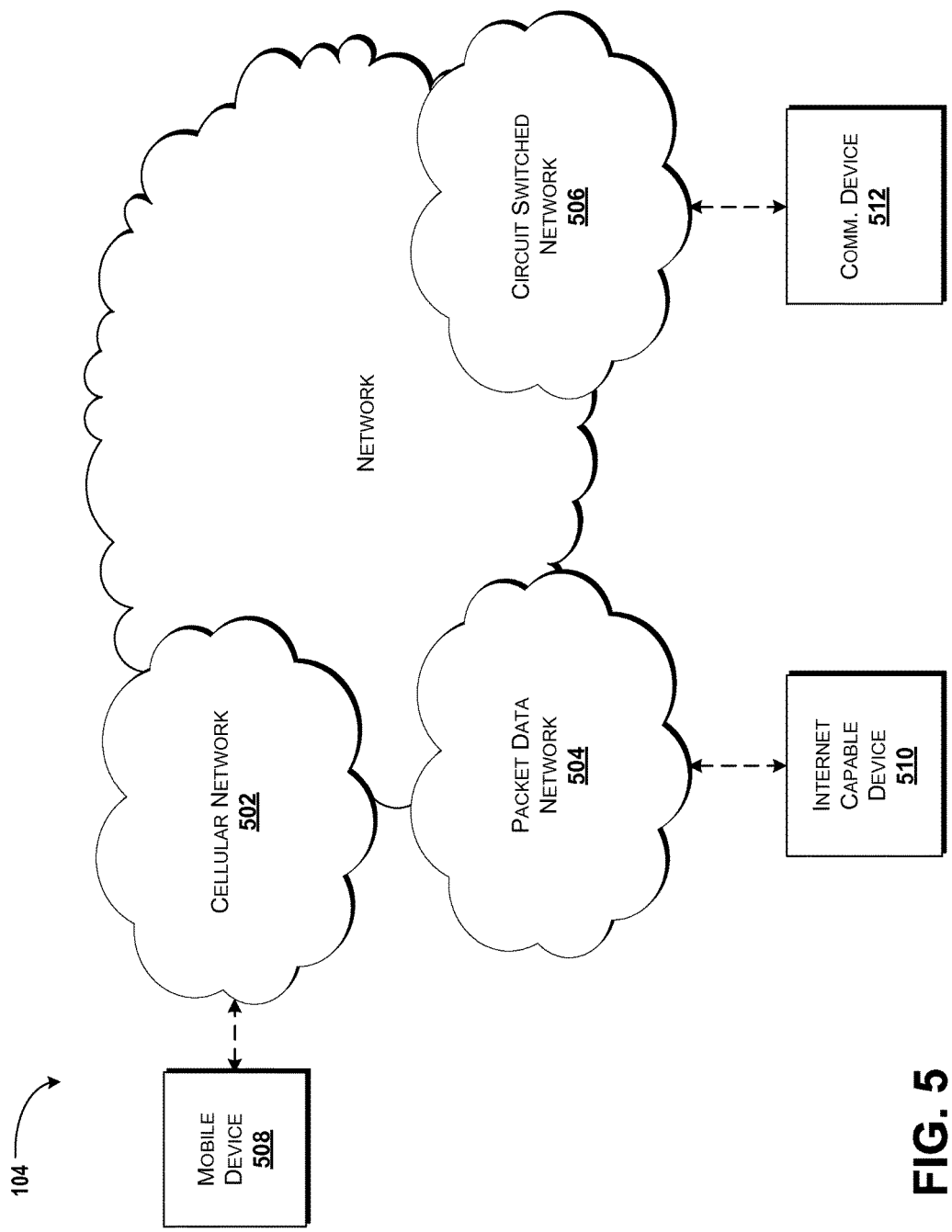
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations, a user can use any combination of the devices disclosed herein including, but not limited to, the mobile device 508, the Internet capable device 510, and/or the communication device 512 to access web pages or other resources 112, to view promotions 114, to save or store the promotions 114, to access or view promotion accounts, to manage promotion accounts, and/or to redeem, share, or otherwise use or consume the promotions 114. As such, it should be understood that users can interface with the promotion service 116 via any number and/or combination of devices. Furthermore, as explained above, users can authorize other entities such as family members, friends, colleagues, and/or others to save, manage, and/or redeem promotions 114 to or from the user's promotion account. As such, a promotion account associated with a user can be available to any number of entities via any number of devices, if desired.

Figure 6:
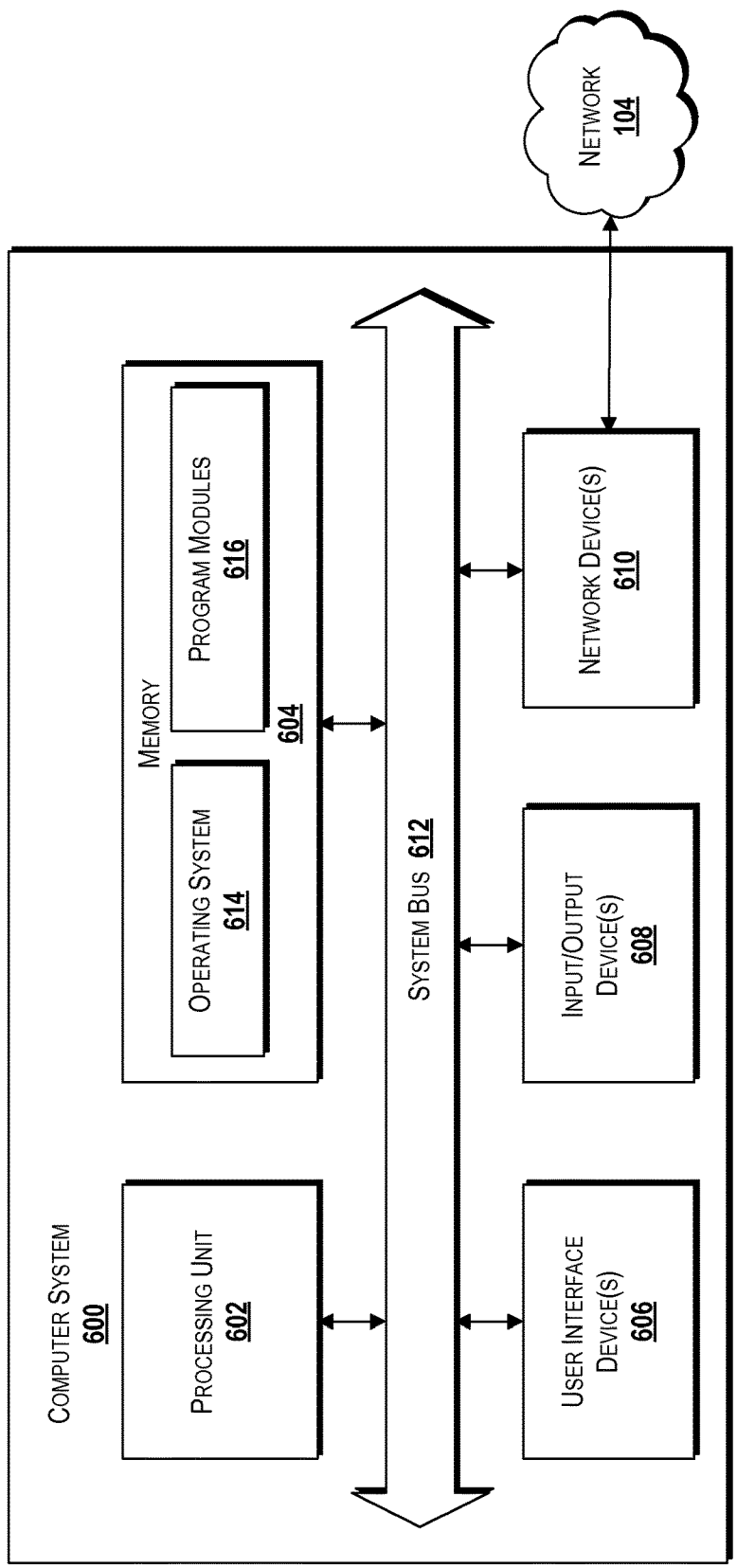
FIG. 6 is a block diagram illustrating an example computer system configured to provide, store, manage, and enable redemption of promotions, according to some illustrative embodiments.

FIG. 6 is a block diagram illustrating a computer system 600 configured to provide the functionality described herein for providing, storing, managing, and/or redeeming the promotions 114, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The program modules 616 may include various software and/or program modules described herein. In some embodiments, for example, the program modules 616 include one or more of the application programs 108, the promotion creation module 118, and/or the promotion management module 120. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the resource 112, promotions 114, the promotion locker 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing, storing, managing, and redeeming promotions have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
receiving, at a server computer comprising a promotion service processor that executes a promotion service and via a communications network, a request to provide a promotion to a web server in communication with the promotion service, wherein the web server hosts a web page that comprises an embedded advertisement frame for the promotion, wherein the web server generates the request in response to loading of the web page by a user device via a mobile telephone network, wherein the web server transmits the request to the promotion service via the communications network, wherein the request is received with identification information associated with the user device that has requested the web page via the mobile telephone network, and wherein the promotion service comprises a promotion creation module that is configured to create the promotion;
determining, by the promotion service processor, a user associated with the request based on the identification information associated with the user device that has requested the web page from the web server, wherein the web server obtains the identification information from the user device, and wherein determining the user comprises
   querying, using the identification information, a mobile telephone network device to determine an identity of the user based on the identification information, and
   receiving, from the mobile telephone network device, the identity in response to the querying;
retrieving, by the promotion service processor and from a promotion locker, a plurality of promotions to provide to the web server based upon the identity of the user, wherein the promotion service processor creates one of the plurality of promotions using the promotion creation module and based on the identity, wherein the promotion creation module creates the one of the plurality of promotions to include code for launching an authentication screen when the one of the plurality of promotions is interacted with at the user device, and wherein the one of the plurality of promotions further comprises an embedded command comprising code that, when interacted with at the user device, calls the promotion service to store the one of the plurality of promotions;
determining, by the promotion service processor and via accessing a global positioning system device associated with the user device, a current geographic location of the user device;
determining, by the promotion service processor, a context associated with the request, the context comprising content of the web page;
selecting, by the promotion service processor and based on the geographic location of the user device and the context, the one of the plurality promotions from the plurality of promotions, wherein the one of the plurality of promotions relates to a product offered by a vendor associated with the geographic location of the user device, and wherein the vendor is associated with a partner site hosted by the web server;
providing, by the promotion service processor and via the communications network, the one of the plurality of promotions to the web server, wherein the web server provides the one of the plurality of promotions to the user device in the embedded advertisement frame within the web page when the web page is provided to the user device during loading of the web page and in response to the web page being requested by the user device, wherein the web page is presented at the user device with the one of the plurality of promotions in the embedded advertisement frame;
receiving, by the promotion service processor and from the user device and via the mobile telephone network and the communications network, a request to store the one of the plurality of promotions in the promotion locker that is associated with a user account, wherein the request to store the one of the plurality of promotions is generated by the user device based on input detected by the user device based on an interaction with the one of the plurality of promotions in the embedded advertisement frame within the web page, and wherein the request is generated in response to the user device executing the embedded command included in the one of the plurality of promotions;
identifying, by the promotion service processor, the user as being associated with the request to store the one of the plurality of promotions;
determining, by the promotion service processor, if the one of the plurality of promotions is valid based upon the identity, the geographic location, an age associated with the user, account information associated with the user, an account status associated with the user, and an expiration date associated with the one of the plurality of promotions;
determining, by the promotion service processor, if save limits are associated with the one of the plurality of promotions, wherein the save limits comprise a number of times promotions can be saved by users;
in response to determining that the save limits are associated with the one of the plurality of promotions, accessing, by the promotion service processor, the user account associated with the user to determine a number of times the one of the plurality of promotions has been saved by the user;
in response to determining that the number of times exceeds the save limits,
   determining, by the promotion service processor, that the one of the plurality of promotions is invalid, and
   removing, by the promotion service processor, the one of the plurality of promotions from the promotion locker; and
in response to determining that the number of times does not exceed the save limits,
   determining, by the promotion service processor, that the one of the plurality of promotions is valid, and
   storing, by the promotion service processor, the one of the plurality of promotions in the promotion locker.

2. The method of claim 1, wherein the context further comprises a market within which the user device is located and a shopping history associated with the user, and wherein the shopping history comprises a promotion redemption history associated with the user.

3. The method of claim 1, further comprising:
receiving, by the promotion service processor and from a partner site, a request to access stored promotions in the promotion locker;
searching, by the promotion service processor, the promotion locker for the stored promotions; and
providing, by the promotion service processor and to the partner site, the stored promotions, wherein the partner site presents, in a user interface,
an indication that the promotion locker has been accessed, and
a price for a further product that is offered by the partner site, wherein the price reflects a discount based on the promotions.

4. The method of claim 1, further comprising:
receiving, by the promotion service processor and from the user device, a request to access stored promotions associated with the user device; and
searching, by the promotion service processor, the promotion locker associated with the user device for the stored promotions.

5. The method of claim 1, wherein the promotion service enables the user to authorize other users to redeem promotions from the user account associated with the user and wherein the user authorizes the other users using settings or preferences associated with the user account.

6. The method of claim 5, wherein the user has a promotion account associated with the promotion service, the promotion account comprising the user account, wherein the promotion account comprises the promotion locker, wherein the user has an account associated with the partner site, wherein the shopping site registers with the promotion service, and wherein the web page, when loaded, displays information from the promotion account.

7. The method of claim 1, wherein the user logs in to the promotion service and to the partner site, wherein in response to logging in to the promotion service and to the partner site, the partner sites is able to access the promotion account associated with the user, and wherein the user logs in to the promotion service via a web portal that is hosted by the partner site.

8. A non-transitory computer storage medium comprising computer executable instructions stored thereon that, when executed by a processor, cause the processor to perform operations comprising:
receiving, from a web server and at a promotion service and via a communications network, a request to provide a promotion to the web server in communication with the promotion service, wherein the web server hosts a web page that comprises an embedded advertisement frame for the promotion, wherein the web server generates the request in response to loading of the web page by a user device via a mobile telephone network, wherein the web server transmits the request to the promotion service via the communications network, wherein the request is received with identification information associated with the user device that has requested the web page via the mobile telephone network, and wherein the promotion service comprises a promotion creation module that is configured to create the promotion;
determining a user associated with the request based on the identification information associated with the user device that has requested the web page from the web server, wherein determining the user comprises
querying a mobile telephone network device to determine an identity of the user based on the identification information, and
receiving the identity in response to the querying;
retrieving, from a promotion locker, a plurality of promotions to provide to the web server based upon the identity of the user, wherein the one of the plurality of promotions is created using the promotion creation module and based on the identity, wherein the promotion creation module creates the one of the plurality of promotions to include code for launching an authentication screen when the one of the plurality of promotions is interacted with at the user device, and wherein the one of the plurality of promotions further comprises an embedded command comprising code that, when interacted with at the user device, calls the promotion service to store the one of the plurality of promotions;
determining, via accessing a global positioning system device associated with the user device, a current geographic location of the user device;
determining a context associated with the request, the context comprising content of the web page;
selecting, based on the geographic location of the user device and the context, the one of the plurality promotions from the plurality of promotions, wherein the one of the plurality of promotions relates to a product offered by a vendor associated with the geographic location of the user device, and wherein the vendor is associated with a partner site hosted by the web server;
providing, via the communications network, the one of the plurality of promotions to the web server, wherein the web server provides the one of the plurality of promotions to the user device in the embedded advertisement frame within the web page when the web page is provided to the user device during loading of the web page and in response to the web page being requested by the user device, wherein the web page is presented at the user device with the one of the plurality of promotions in the embedded advertisement frame;
receiving, from the user device and via the mobile telephone network and the communications network, a request to store the one of the plurality of promotions in the promotion locker associated with a user account, wherein the request to store the one of the plurality of promotions is generated by the user device based on input detected by the user device based on an interaction with the one of the plurality of promotions in the embedded advertisement frame within the web page, and wherein the request is generated in response to the user device executing the embedded command included in the one of the plurality of promotions;
identifying the user as being associated with the request to store the one of the plurality of promotions;
determining if the one of the plurality of promotions is valid based upon the identity, the geographic location, an age associated with the user, account information associated with the user, an account status associated with the user, and an expiration date associated with the one of the plurality of promotions;
determining if save limits are associated with the one of the plurality of promotions, wherein the save limits comprise a number of times promotions can be saved by users;
in response to determining that the save limits are associated with the one of the plurality of promotions, accessing the user account associated with the user to determine a number of times the one of the plurality of promotions has been saved by the user;
in response to determining that the number of times exceeds the save limits,
  determining that the one of the plurality of promotions is invalid, and
  removing the one of the plurality of promotions from the promotion locker; and
in response to determining that the number of times does not exceed the save limits,
  determining that the one of the plurality of promotions is valid, and
  storing the one of the plurality of promotions in the promotion locker.

9. The non-transitory computer storage medium of claim 8, wherein determining the context comprises determining that the user is associated with the request, a market within which the user is located, and a shopping history associated with the user, wherein the shopping history comprises a promotion redemption history associated with the user.

10. The non-transitory computer storage medium of claim 8, wherein the computer executable instructions, when executed by the processor, cause the processor to perform operations further comprising:
receiving, from a partner site, a request to access stored promotions in the promotion locker;
searching the promotion locker for the stored promotions; and
providing, to the partner site, the stored promotions, wherein the partner site presents, in a user interface,
  an indication that the promotion locker has been accessed, and
  a price for a further product that is offered by the partner site, wherein the price reflects a discount based on the promotions.

11. The non-transitory computer storage medium of claim 8, wherein the computer executable instructions, when executed by the processor, cause the processor to perform operations further comprising:
receiving, from the user device, a request to access stored promotions associated with the user device; and
searching the promotion locker associated with the user device for the stored promotions.

12. The non-transitory computer storage medium of claim 8, wherein the promotion service enables the user to authorize other users to redeem promotions from the user account associated with the user and wherein the user authorizes the other users using settings or preferences associated with the user account.

13. The non-transitory computer storage medium of claim 12, wherein the user has a promotion account associated with the promotion service, the promotion account comprising the user account, wherein the promotion account comprises the promotion locker, wherein the user has an account associated with the partner site, wherein the shopping site registers with the promotion service, and wherein the web page, when loaded, displays information from the promotion account.

14. A device comprising:
a processor; and
a memory that stores computer-executable instructions that, when executed by the processor, cause the processor to perform operations comprising
  receiving, from a web server and at a promotion service via a communications network, a request to provide a promotion to the web server, which is in communication with the promotion service, wherein the web server hosts a web page that comprises an embedded advertisement frame for the promotion, wherein the web server generates the request in response to loading of the web page by a user device via a mobile telephone network, wherein the web server transmits the request to the promotion service via the communications network, wherein the request is received with identification information associated with the user device that has requested the web page via the mobile telephone network, and wherein the promotion service comprises a promotion creation module that is configured to create the promotion,
  determining a user associated with the request based on the identification information associated with the user device that has requested the web page from the web server, wherein determining the user comprises
    querying a mobile telephone network device to determine an identity of the user based on the identification information, and
    receiving the identity in response to the querying,
  retrieving, from a promotion locker, a plurality of promotions to provide to the web server based upon the identity of the user, wherein the one of the plurality of promotions is created using the promotion creation module and based on the identity, wherein the promotion creation module creates the one of the plurality of promotions to include code for launching an authentication screen when the one of the plurality of promotions is interacted with at the user device, and wherein the one of the plurality of promotions further comprises an embedded command comprising code that, when interacted with at the user device, calls the promotion service to store the one of the plurality of promotions,
  determining, via accessing a global positioning system device associated with the user device, a current geographic location of the user device,
  determining a context associated with the request, the context comprising content of the web page,
  selecting, based on the geographic location of the user device, the one of the plurality promotions from the plurality of promotions, wherein the one of the plurality of promotions relates to a product offered by a vendor associated with the geographic location of the user device, and wherein the vendor is associated with a partner site hosted by the web server,
  providing, via the communications network, the one of the plurality of promotions to the web server, wherein the web server provides the one of the plurality of promotions to the user device in the embedded advertisement frame within the web page when the web page is provided to the user device during loading of the web page and in response to the web page being requested by the user device, wherein the web page is presented at the user device with the one of the plurality of promotions in the embedded advertisement frame,
  receiving, from the user device and via the mobile telephone network and the communications network, a request to store the one of the plurality of promotions in the promotion locker, which is associated with a user account, wherein the request to store the one of the plurality of promotions is generated by the user device based on input detected by the user device based on an interaction with the one of the plurality of promotions in the embedded advertisement frame within the web page, and wherein the request is generated in response to the user device executing the embedded command included in the one of the plurality of promotions, identifying the user as being associated with the request to store the one of the plurality of promotions, determining if the one of the plurality of promotions is valid based upon the identity, the geographic location, an age associated with the user, account information associated with the user, an account status associated with the user, and an expiration date associated with the one of the plurality of promotions, determining if save limits are associated with the one of the plurality of promotions, wherein the save limits comprise a number of times promotions can be saved by users, in response to determining that the save limits are associated with the one of the plurality of promotions, accessing the user account associated with the user to determine a number of times the one of the plurality of promotions has been saved by the user, in response to determining that the number of times exceeds the save limits,
- determining that the one of the plurality of promotions is invalid, and
- removing the one of the plurality of promotions from the promotion locker, and in response to determining that the number of times does not exceed the save limits,
- determining that the one of the plurality of promotions is valid, and
- storing the one of the plurality of promotions in the promotion locker.

15. The device of claim 14, wherein providing the one of the plurality of promotions comprises providing data that references the one of the plurality promotions, and wherein the one of the plurality of promotions is obtained by the user device when the web page is loaded by the user device.

16. The device of claim 14, wherein the computer executable instructions, when executed by the processor, cause the processor to perform operations further comprising:

receiving, from a partner site, a request to access stored promotions in the promotion locker;

searching the promotion locker for the stored promotions; and providing, to the partner site, the stored promotions, wherein the partner site presents, in a user interface,
- an indication that the promotion locker has been accessed, and
- a price for a further product offered by the partner site, wherein the price reflects a discount based on the promotions.

17. The device of claim 14, wherein the computer executable instructions, when executed by the processor, cause the processor to perform operations further comprising:

receiving, from the user device, a request to access stored promotions associated with the user device;

searching the promotion locker associated with the user device for the stored promotions.

18. The device of claim 14, wherein the user logs in to the promotion service and to the partner site, wherein in response to logging in to the promotion service and to the partner site, the partner sites is able to access the promotion account associated with the user, and wherein the user logs in to the promotion service via a web portal that is hosted by the partner site.

19. The device of claim 14, wherein the promotion service enables the user to authorize other users to redeem promotions from the user account associated with the user, and wherein the user authorizes the other users using settings or preferences associated with the user account.

20. The device of claim 19, wherein the user has a promotion account associated with the promotion service, the promotion account comprising the user account, wherein the promotion account comprises the promotion locker, wherein the user has an account associated with the partner site, wherein the shopping site registers with the promotion service, and wherein the web page, when loaded, displays information from the promotion account.

* * * * *